3,328,122
PROCESS FOR PRODUCING ALUMINA COMPRISING NORDSTRANDITE IN MAJOR PROPORTION

William L. Kehl, Indiana Township, Allegheny County, and Meredith M. Stewart, Penn Hills Township, Allegheny County, Pa., assignors to Gulf Research & Development Company, Pittsburgh, Pa., a corporation of Delaware
No Drawing. Filed June 27, 1963, Ser. No. 290,951
8 Claims. (Cl. 23—143)

This invention relates to the crystalline trihydrate of alumina known as nordstrandite as prepared in a state of high purity and to a method for its preparation in a state of high purity.

According to prior art methods of preparation, the crystalline form of alumina trihydrate known as nordstrandite has been prepared only as a minor or trace constituent in admixture with other alumina hydrates and has not previously been prepared in a state of high purity. A common prior art method of preparing nordstrandite comprises the addition of ammonium hydroxide to an acid aluminum salt so that precipitation occurs in an acidic pH range. The alumina precipitate formed in an acidic pH range is an amorphous alumina gel. The prior art method requires a prolonged period of aging of the precipitate in dilute ammonium hydroxide, whereupon the amorphous gel becomes converted to a mixture of crystalline trihydrates containing nordstrandite in minor or trace proportion together with bayerite in major proportion. Upon calcination of the prior art mixture of trihydrates, the bayerite and the nordstrandite each yields its respective and distinctive eta alumina, so that the calcined alumina anhydride product of the prior art contains nordstrandite-derived eta alumina in only minor or trace quantity together with a major proportion of bayerite-derived eta alumina.

In accordance with the method of this invention, the crystalline form of alumina trihydrate known as nordstrandite is precipitated for the first time in a state of high purity. The method of this invention produces nordstrandite as a substantially immediate constituent in major proportion in an unaged alumina hydrate precipitate and is even capable of producing nordstrandite in a substantially pure condition in the absence of an aging step. The product of this invention easily contains about 90 percent by weight of nordstrandite and can contain as much as about 95 to 100 percent by weight of nordstrandite as a substantially immediate precipitate in the absence of an aging step. Upon calcination, at a temperature of at least about 500° F., but not more than about 1400° F., the nordstrandite is converted to eta alumina. The nordstrandite-derived eta alumina was found to possess much larger pores and a greater pore volume as compared to eta alumina derived from bayerite. These characteristics render nordstrandite-derived eta alumina a highly desirable support for catalysts intended for the treatment of molecules of large size which might be unable to penetrate small catalyst pores. Nordstrandite-derived eta alumina possesses unusually high total acidity, higher than bayerite-derived eta alumina and even higher than active commercial silica-alumina catalyst supports. The proportion of weak acid sites in nordstrandite-derived eta alumina is greater than the proportion of weak acid sites in either bayerite-derived eta alumina or in active commercial silica-alumina catalyst supports. This makes nordstrandite-derived eta alumina an advantageous support for hydrocracking catalysts where weak acidity is desirable.

X-ray diffraction analyses conducted upon both bayerite-derived eta alumina and eta alumina derived from substantially pure nordstrandite show that the two forms of eta alumina are structurally distinct. Therefore, since the method of this invention produces substantially pure nordstrandite, this method is likewise capable of producing nordstrandite-derived eta alumina in an unprecedentedly high state of purity since the methods of the prior art were capable only of producing nordstrandite in minor or trace quantities in a predominant mass of bayerite. That nordstrandite-derived eta alumina is distinct from bayerite-derived eta alumina is seen by the effect of calcination upon each hydrate. The X-ray diffraction tests showed that upon heating bayerite, eta alumina was formed at 932° F. Upon further heating, the bayerite-derived eta alumina was partially transformed to theta alumina at 1382° F. and was completely transformed to theta alumina at 1652° F. Upon calcination of substantially pure nordstrandite, nordstrandite-derived eta alumina was obtained at 932° F. Upon further heating, the nordstrandite-derived eta alumina was still unchanged at 1382° F. but was completely converted to theta alumina at 1652° F. The fact that bayerite-derived eta alumina begins to transform to theta alumina at a lower temperature than does nordstrandite-derived eta alumina indicates that the two aluminas are structurally different.

In accordance with this invention a solution of an acid aluminum salt is slowly added to a solution containing hydroxyl ions having a pH higher than 11 so that the pH of the hydroxyl ion solution is not lowered below a minimum value of about 11, while maintaining carbonate dissolved in the mixing solution in an amount which is adapted so that the alumina hydrate precipitated comprises nordstrandite of high purity.

It is important that the entire precipitation occur in a highly alkaline environment wherein the minimum pH is at least 11. Therefore, the acid solution of aluminum salt must be added to a highly alkaline solution containing hydroxyl ions whose pH is higher than 11. The pH of the alkaline solution is preferably about 12 or more. The acid aluminum salt solution preferably is added to the alkaline solution in increments in a slow, intermittent manner, and with stirring, so that the pH of the alkaline solution is only slowly reduced from a value of about 12 or more down to a minimum pH of 11. Temporary localized zones in the mixing solution having a pH below 11 are avoided during the mixing operation because the alumina formed in such localized zones is not the desired product of this invention. In an advantageous embodiment, the addition of the acid aluminum salt solution to the alkaline solution can be accompanied by the addition to the mixing solution of a separate stream of hydroxyl ion-containing alkaline solution, either continuously or in increments, in order to continuously maintain the pH of the mixing solution above 11 and to permit extended addition of acid aluminum salt solution.

The mixing solution must contain carbonate in solution in an amount that the alumina hydrate precipitate comprises substantially pure nordstrandite. If bicarbonate is added to the mixing solution, it will be converted to carbonate at the elevated pH condition therein. The amount of carbonate or bicarbonate salt dissolved in the mixing solution which is conducive to the preparation of nordstrandite will vary widely depending upon the particular carbonate or bicarbonate compound employed, depending upon the particular base used, and also depending upon the particular aluminum salt. The proper concentration of carbonate in the mixing solution may also vary depending upon other factors such as reaction temperature, etc. Generally, it is desirable to dissolve between about 1 and 60 grams per liter of carbonate or bicarbonate salt in the starting alkaline solution prior to addition of acid aluminum salt solution, and to approximately maintain this concentration in the mixing solution during the precipitation reaction. More preferably, the concentration of carbonate or bicarbonate salt in the starting alkaline solution is between about 4 and 40 grams per liter and most preferably between about 7 and 25 grams per liter.

If the amount of carbonate dissolved in the mixing solution is above or below the proper range the precipitate formed either will contain nordstrandite in a highly impure condition or will be devoid of nordstrandite. The proper carbonate concentration range is most conveniently based upon the original alkaline solution having a pH higher than 11 to which the acid aluminum salt solution is subsequently added. The reason is that the amount of alkaline solution is large in comparison to the amount of aluminum salt solution which is subsequently added. If the addition of acid aluminum salt solution is accompanied by the addition of additional alkaline solution, so that the total quantity of added solution is relatively great, the concentration of carbonate may fall below the range of the invention in which case more carbonate must be added to the mixture.

Maintaining the pH in the mixing solution at a value no lower than 11 throughout the mixing operation and maintaining carbonate ion in solution throughout the mixing operation are both critical features of the method of this invention. Since the concentration of carbonate in the mixing solution is critical, the carbonate is present in addition to a separate more highly alkaline substance which has for its function imparting alkalinity to the mixing solution. Unlike the carbonate, the other alkaline substance is present in massive amount and is freely increased in concentration to maintain a pH in the mixing solution of at least 11. In contrast, the carbonate does not have as its primary purpose the impartation of alkalinity to the mixing solution and the concentration of carbonate cannot be increased outside of the critical range of this invention for the purpose of pH adjustment in the mixing solution.

Carbonate ions are added to the mixing solution by dissolving therein either a soluble carbonate compound or a soluble bicarbonate compound. A variety of carbonates and bicarbonates can be used. Soluble carbonate or bicarbonate compounds whose cations are readily removable from the precipitate by washing or volatilization are preferred. Ammonium carbonate and ammonium bicarbonate are most preferred. It is immaterial whether a carbonate or a bicarbonate salt is added since at the elevated pH of the mixing solution bicarbonate ion is converted to carbonate ion. For example, when ammonium bicarbonate is added to a solution of ammonium hydroxide whose pH is 9 or higher, the bicarbonate becomes converted to carbonate according to the reaction:

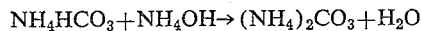

$$NH_4HCO_3 + NH_4OH \rightarrow (NH_4)_2CO_3 + H_2O$$

The carbonate ion present in the mixing solution is not consumed by the precipitation reaction but remains in solution during the precipitation of alumina hydrate and causes essentially no contamination in the alumina hydrate. For example, if the carbonate is added as ammonium carbonate, the ammonium carbonate hydrolyzes to produce both carbonate ion and hydroxyl ion. The carbonate ion remains in solution and is not consumed but the hydroxyl ion is consumed in the formation of aluminum hydroxide precipitate. The reason carbonate ion is not consumed is that, due to extreme instability, any aluminum carbonate which forms does not precipitate but immediately hydrolyzes. While ammonium carbonate is basic, it is not sufficiently basic to produce a solution whose pH is above 11. Thus, while the ammonium carbonate contributes hydroxyl ions to the precipitation reaction this is only an incidental function and by far the greatest quantity of hydroxyl ions for reaction with aluminum ions must come from a more basic material such as ammonium hydroxide.

A number of alkaline substances can be employed in maintaining the reaction mixture at a pH greater than 11. Bases whose cations are readily removed from the precipitate by washing or vaporization are preferred. The most preferred base is ammonium hydroxide. Alkyl substituted ammonium hydroxide compounds, such as quaternary ammonium hydroxide, can be employed. It is not desirable to employ hydroxides of alkali metals, such as sodium and potassium hydroxide. Similarly, it is not desirable to employ alkali metal carbonates or bicarbonates. The reason is that alkali metals such as sodium and potassium remain as impurities in the alumina hydrate precipitate, even after prolonged washings. If the alumina is to be employed in a catalyst these metals tend to reduce the catalytic activity of the final product. A further disadvantage in the use of sodium or potassium is that even trace quantities of these metals drastically inhibit the ability of a catalyst containing dehydrated alumina to undergo reactivation by the common method of burning carbonaceous impurities from the catalyst surface since these metals have low melting points and act as fluxes, tending to sinter active catalytic sites during high temperature catalytic reactivation.

A variety of acid aluminum salts can be employed in accordance with this invention. The most preferable aluminum salts are those whose anions are most easily removable from the alumina hydrate precipitate. In this regard, aqueous solutions of aluminum chloride and aluminum nitrate are most advantageous. Aqueous solutions of soluble aluminum salts of carboxylic acids such as aluminum formate, aluminum acetate and aluminum propionate can be employed. Aqueous aluminum sulfate solution is not advantageous since it is difficult to adequately remove sulfate from the product even by protracted washings.

The concentration of the acid aluminum salt in the aqueous aluminum salt solution is not critical. The concentration can vary within wide limits, for example, between 0.1 and 4 molality, generally, and preferably between 1 and 2 molality.

Examples 1, 2 and 3 describe tests made to illustrate the method of this invention for the preparation of nordstrandite of high purity.

EXAMPLE 1

Ammonium hydroxide was added to a solution of 100 grams of ammonium bicarbonate in 1000 milliliters of water until a pH of 11.5 was obtained. To this solution was added dropwise and with stirring a second solution containing 1000 grams of aluminum chloride hydrate in 5000 milliliters of water until a pH of 11 was obtained. The slurry was allowed to stand overnight and the precipitate was then washed by decantation with water. The precipitate was recovered by filtration and dried at 250° F. for 16 hours. Analysis by X-ray diffraction showed the precipitate was almost entirely nordstrandite with only a trace of impurity. The sample was then calcined at 900° F. for 16 hours to form a nordstrandite-derived eta alumina having physical characteristics as shown in Table 1.

EXAMPLE 2

The precipitation method described in Example 1 was repeated. The precipitate was dried at 250° F. for 16 hours and was found by X-ray diffraction analysis to be substantially pure nordstrandite. The sample was then calcined at 900° F. for 16 hours to produce a nordstrandite-derived eta alumina having physical characteristics as shown in Table 1.

EXAMPLE 3

To a solution of 100 grams of $NH_4HCO_3$ in 100 milliliters of water was added 8.9 liters of aqueous ammonia (28 percent $NH_3$). The resulting solution had a pH of 11.7. To this was added in a slow stream with stirring 1400 milliliters of a solution made by dissolving 1000 grams of $AlCl_3 \cdot 6H_2O$ in 5 liters of water. The resulting slurry was allowed to stand overnight, washed by decantation with 48 liters of water and filtered. The resulting cake was dried for 16 hours at 250° F. X-ray analysis showed it to be nordstrandite. It was calcined at 900° F. for 16 hours to produce a nordstrandite-derived eta alumina having physical characteristics as shown in Table 1.

EXAMPLE 4

A sample of substantially pure bayerite was prepared and calcined to produce eta alumina. Table 1 shows the physical characteristics of the bayerite-derived eta alumina for purposes of comparing the qualities of bayerite-derived eta alumina with nordstrandite-derived eta alumina. According to prior art methods nordstrandite was prepared in only minor proportion together with a major proportion of bayerite.

EXAMPLE 5

A first solution was prepared containing 10 grams of amonium bicarbonate and 10 milliliters of concentrated ammonia (28 percent $NH_3$) in 1000 milliliters of water and having a pH of 10.2. A second solution was prepared containing 100 grams of $AlCl_3 \cdot 6H_2O$ in 1000 milliliters of water. The second aqueous solution was added to the first aqueous solution with constant stirring until a pH of 10 was obtained. Then $NH_4OH$ was added to raise the pH to 10.2, and the procedure was repeated until all the $AlCl_3 \cdot 6H_2O$ solution was used up. A total of 460 milliliters of $NH_4OH$ was required. The final pH of the slurry was adjusted to 10 and the mixture was allowed to stand overnight. The precipitate was gelatinous and could not be washed by decantation. The slurry was filtered and the TABLE 1.—PHYSICAL CHARACTERISTICS OF ETA ALUMINAS DERIVED FROM NORDSTRANDITE AND BAYERITE

|  | Example 1 | Example 2 | Example 3 | Example 4 |
|---|---|---|---|---|
|  | Precursor | | | |
|  | Nord-strandite | Nord-strandite | Nord-strandite | Bayerite |
| Pore Volume, Milliliters Per Gram | 0.62 | 0.60 | 0.67 | 0.36 |
| Average Pore Radius, Angstrom Units | 61 | 153 | 114.4 | 22 |
| Surface Area, Square Meters Per Gram | 344 | 248 | 327 | 331 |
| Pore Size Distribution, Percent by Volume Per Pore Radius, A.: | | | | |
| 200 | 19.2 | 34.4 | 19.5 | 3.7 |
| 100–200 | 21.3 | 31.9 | 35.7 | 6.2 |
| 50–100 | 12.4 | 11.3 | 13.7 | 9.6 |
| 40–50 | 3.6 | 2.2 | 2.6 | 6.3 |
| 30–40 | 7.9 | 1.8 | 3.4 | 10.9 |
| 20–30 | 18.9 | 2.7 | 8.2 | 23.0 |
| 10–20 | 16.8 | 15.8 | 16.9 | 40.3 |
| 10 | 0.0 | 0.0 | 0.0 | 0.0 |

It is seen that nordstrandite-derived eta alumina has a larger pore volume relative to bayerite-derived eta alumina and a larger average pore radius relative to bayerite-derived eta alumina. Most of the pores of nordstrandite-derived eta alumina are 50 A. or greater in radius while bayerite-derived alumina has comparatively small pores, most of them being between 10 A. and 40 A. in radius. Nordstrandite-derived eta alumina has greater over-all porosity as compared to bayerite-derived eta alumina.

Table 2 shows the results of surface acidity tests made to determine the surface acidity of nordstrandite-derived eta alumina, bayerite-derived eta alumina, and an active commercial silica-alumina catalyst support.

TABLE 2.—SURFACE ACIDITY

| Catalyst | Milliequivalents of Ammonia Absorbed Per Gram of Catalyst | | | |
|---|---|---|---|---|
|  | Temperature, °F. | | | |
|  | 392 | 572 | 752 | 932 |
| Nordstrandite-Derived Eta Alumina | 0.60 | 0.45 | 0.32 | 0.20 |
| Bayerite-Derived Eta Alumina | 0.38 | 0.29 | 0.22 | 0.16 |
| Commercial Silica-Alumina | 0.51 | 0.41 | 0.33 | 0.26 |

Table 2 shows that the surface acidity of nordstrandite-derived eta alumina is greater than the surface acidity of bayerite-derived eta alumina. These tests also show that with decreasing temperatures the surface acidity of nordstrandite-derived eta alumina becomes increasingly greater than the surface acidity of an active commercial silica-alumina catalyst support, indicating a greater proportion of weak acid sites in nordstrandite-derived eta alumina than in commercial silica-alumina.

Examples 5 through 9 describe tests made to illustrate the criticality of both the carbonate concentration range and the pH range of the invention.

gel was washed on the filter with distilled water until the conductivity of the wash water lined out. The filter cake was dried overnight at 250° F. X-ray diffraction analysis showed that no nordstrandite was present.

Example 5 shows that it is essential to the production of nordstrandite that the precipitation occur at a pH of at least 11.

EXAMPLE 6

In this test the aluminum hydroxide precipitation was conducted in a medium free of carbonate.

A solution was prepared containing 6000 milliliters of concentrated ammonium hydroxide (28 percent $NH_3$) diluted with 4000 milliliters of water so that its pH was 11.9. No ammonium carbonate was added. To this solution was added a second solution, also free of carbonate, containing 200 grams of $AlCl_3 \cdot 6H_2O$ in 5000 milliliters of water until a pH of 11.0 was obtained. The pH of the mixture was increased to 11.2 by the addition of 300 milliliters of concentrated ammonium hydroxide and then lowered to 11.0 again by the addition of more of the aluminum chloride solution. The precipitate was washed, dried at 250° F. and subjected to X-ray diffraction analysis. No nordstrandite was found to be present in the precipitate.

Example 6 shows that even though the pH of the mixture is maintained above 11, it is necessary to the recovery of nordstrandite that carbonate be present.

EXAMPLE 7

A first solution was prepared containing 10 grams of ammonium bicarbonate and 750 milliliters of concentrated ammonium hydroxide (28 percent $NH_3$), both dissolved in 1000 milliliters of water so that the pH was 11.7. To this first solution was added 280 milliliters of a second solution containing 100 grams of $AlCl_3 \cdot 6H_2O$ in 500 milliliters of water, dropwise and with stirring, so that the final pH was 11.1. The mixture was allowed to stand overnight and the precipitate was then washed by decantation with 9000 milliliters of distilled water. The precipitate was then dried for 16 hours at 250° F. and analyzed by X-ray diffraction. It was found to be a mixture containing substantial quantities of nordstrandite and gibbsite.

Example 7 shows that at a mixing pH of at least 11, substantially pure nordstrandite is only recovered by precise adjustment of the amount of carbonate in the mixing solution in accordance with this invention.

EXAMPLE 8

A first solution having a pH of 11.3 was prepared by mixing 200 grams of ammonium bicarbonate, 1500 milliliters of concentrated ammonium hydroxide (28 percent $NH_3$) and 1000 milliliters of water. A second solution was prepared by dissolving 100 grams of aluminum chloride hydrate in 500 milliliters of water. The second solution was added to the first solution dropwise and with constant mixing until a pH of 11.05 was reached. After standing for one hour the pH was checked and found to be unchanged. The slurry was allowed to stand overnight and was then washed by decantation with water. It was thereupon dried for 16 hours at 250° F. and examined by X-ray diffraction. No nordstrandite was found to be present.

Example 8 shows that at a mixing pH above 11, nordstrandite is not recovered in the presence of an amount of carbonate in excess of the range of this invention.

EXAMPLE 9

A saturated solution of ammonium bicarbonate was prepared by mixing 300 grams of $NH_4HCO_3$ in 1000 milliliters of water. Thereupon, 2000 milliliters of concentrated $NH_4OH$ (28 percent $NH_3$) was added to obtain a pH of 11.5. To the resulting solution was added dropwise and with stirring 530 milliliters of a solution containing 100 grams of $AlCl_3 \cdot 6H_2O$ dissolved in 500 milliliters of water until the pH dropped to 11.1. The excess ammonium carbonate present appeared to produce a much slower drop in pH level than was observed in previous experiments. The reaction mixture was allowed to stand overnight whereupon the pH was again tested and found to be 11.0. The precipitate was washed by decantation with 16 liters of distilled water and was then dried at 250° F. for 16 hours. X-ray diffraction tests disclosed that no nordstrandite was present.

Example 9 shows that at a mixing pH above 11, nordstrandite is not recovered if the amount of carbonate present is above the range of this invention.

We claim:

1. A method for producing an alumina hydrate precipitate comprising nordstrandite in major proportion, said method comprising adding a solution of an acid aluminum salt to an alkaline solution containing hydroxyl ions having a pH higher than 11 so that the pH of the alkaline solution is not lowered below a minimum value of 11, adding the aluminum salt solution slowly, in increments and with stirring so that temporary localized zones in the mixing solution having a pH below 11 are substantially avoided, and maintaining carbonate dissolved in the mixing solution in a concentration between about 1 and 60 grams per liter of solution so that the alumina hydrate precipitate comprises nordstrandite in major proportion.

2. A method for producing alumina hydrate precipitate comprising nordstrandite in major proportion, said method comprising adding a solution of an acid aluminum salt to a first alkaline solution containing hydroxyl ions having a pH higher than 11, also adding a second alkaline solution containing hydroxyl ions to said first alkaline solution so that the pH of the mixture is not lowered below a minimum value of 11, adding the aluminum salt solution slowly, in increments and with stirring so that temporary localized zones in the mixing solution having a pH below 11 are substantially avoided, and maintaining carbonate dissolved in the mixing solution in a concentration between about 4 and 40 grams per liter so that the alumina hydrate precipitate comprises nordstrandite in major proportion.

3. A method for the precipitation of alumina hydrate comprising nordstrandite in major proportion comprising adding a solution of an aluminum salt whose anion is easily removable from said precipitate to a solution having a pH above 11 of a base whose cation is easily removable from said precipitate, said addition not lowering the pH below a minimum value of 11, adding the aluminum salt solution slowly, in increments and with stirring so that temporary localized zones in the mixing solution having a pH below 11 are substantially avoided, and maintaining in said basic solution a carbonate whose cation is easily removable from said precipitate, said carbonate being present in a concentration between about 7 and 25 grams per liter so that the alumina hydrate precipitate comprises nordstrandite in major proportion.

4. A method for producing an alumina hydrate precipitate comprising nordstrandite in major proportion, said method comprising adding a solution of a salt selected from the group consisting of aluminum chloride and aluminum nitrate to a solution of ammonium hydroxide having a pH higher than 11 so that the pH of the ammonium hydroxide solution is not lowered below a minimum value of 11, adding the aluminum salt solution slowly, in increments and with stirring so that temporary localized zones in the mixing solution having a pH below 11 are substantially avoided, and maintaining ammonium carbonate dissolved in the mixing solution in a concentration between about 1 and 60 grams per liter so that the alumina hydrate precipitate comprises nordstrandite in major proportion.

5. A method for producing an alumina hydrate precipitate comprising nordstrandite in major proportion, said method comprising adding a solution of a salt selected from the group consisting of aluminum chloride and aluminum nitrate to a first solution of ammonium hydroxide having a pH higher than 11, also adding a second solution of ammonium hydroxide to said first solution of ammonium hydroxide so that the pH of the mixture is not lowered below a minimum value of 11, adding the aluminum salt solution slowly, in increments and with stirring so that temporary localized zones in the mixing solution having a pH below 11 are substantially avoided, and maintaining ammonium carbonate dissolved in the mixing solution in a concentration between about 4 and 40 grams per liter so that the alumina hydrate precipitate comprises nordstrandite in major proportion.

6. A method for producing nordstrandite-derived eta alumina from an alumina hydrate comprising nordstrandite in major proportion, said method comprising adding a solution of an acid aluminum salt to an alkaline solution having a pH higher than 11 so that the pH of the alkaline solution is not lowered below a minimum value of 11, adding the aluminum salt solution slowly, in increments and with stirring so that temporary localized zones in the mixing solution having a pH below 11 are substantially avoided, maintaining a carbonate dissolved in the mixing solution in a concentration between about 1 and 60 grams per liter so that the alumina hydrate precipitate comprises nordstrandite in major proportion, drying and calcining said nordstrandite to produce nordstrandite-derived eta alumina.

7. A method for producing nordstrandite-derived eta alumina from an alumina hydrate comprising nordstrandite in major proportion, said method comprising adding a solution of a salt selected from the group consisting of aluminum chloride and aluminum nitrate to a first solution of ammonium hydroxide having a pH higher than 11, also adding a second solution of ammonium hydroxide to said first solution of ammonium hydroxide so that the pH of the mixture is not lowered below a minimum value of 11, adding the aluminum salt solution slowly, in increments and with stirring so that temporary localized zones in the mixing solution having a pH below 11 are substantially avoided, and maintaining ammonium carbonate dissolved in the mixing solution in a concentration between about 1 and 60 grams per liter so that the alumina hydrate precipitate comprises nordstrandite in major proportion, drying and calcining said nordstrandite at a temperature between 500° F. and 1400° F. to produce nordstrandite-derived eta alumina.

8. A method for producing nordstrandite-derived eta alumina from an alumina hydrate comprising nordstrandite in major proportion, said method comprising adding a solution of a salt selected from the group consisting of aluminum chloride and aluminum nitrate to a first solution of ammonium hydroxide having a pH higher than 11, also adding a second solution of ammonium hydroxide to said first solution of ammonium hydroxide so that the pH of the mixture is not lowered below a minimum value of 11, adding the aluminum salt solution slowly, in increments and with stirring so that temporary localized zones in the mixing solution having a pH below 11 are substantially avoided, and maintaining between about 1 and 60 grams per liter of ammonium carbonate dissolved in the mixing solution so that the alumina hydrate precipitate comprises nordstrandite in major proportion, drying and calcining said nordstrandite at a temperature between about 500° F. and 1400° F. to produce nordstrandite-derived eta alumina.

References Cited
UNITED STATES PATENTS

| | | | |
|---|---|---|---|
| 2,932,620 | 4/1960 | Fuener et al. | 23—143 X |
| 3,058,907 | 10/1962 | Van Nordstrand et al. | 23—143 X |
| 3,096,154 | 7/1963 | Stewart | 23—143 |
| 3,222,130 | 12/1965 | Hauschild | 23—143 |

OSCAR R. VERTIZ, *Primary Examiner.*

H. T. CARTER, *Assistant Examiner.*